Aug. 4, 1959 D. E. GARRETT ET AL 2,898,510
HEIGHT COMPENSATION IN VERTICAL OUTPUT STAGE
Filed March 6, 1958
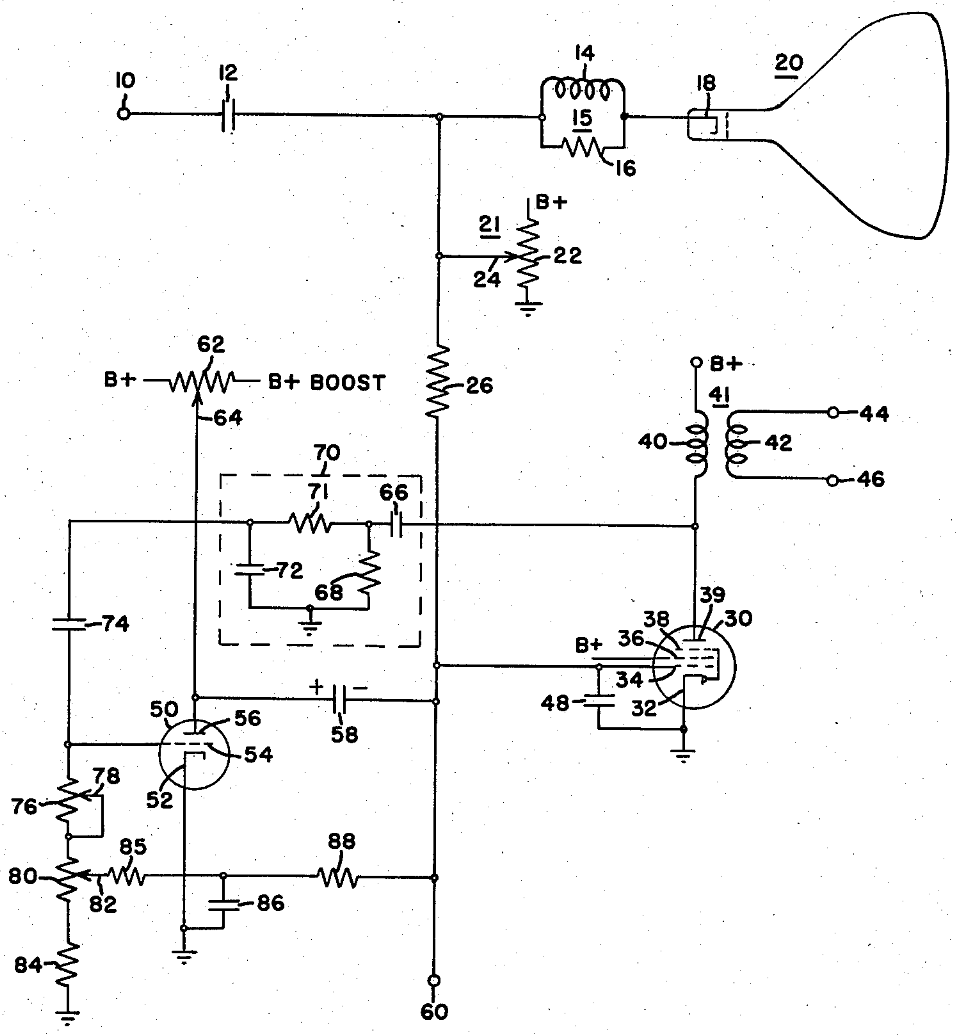
INVENTORS:
HARRY T. FREESTONE,
DONALD E. GARRETT,
BY Joseph Levinson
THEIR ATTORNEY.

2,898,510

HEIGHT COMPENSATION IN VERTICAL OUTPUT STAGE

Donald E. Garrett and Harry T. Freestone, North Syracuse, N.Y., assignors to General Electric Company, a corporation of New York Application March 6, 1958, Serial No. 719,542

3 Claims. (Cl. 315—22)

This invention relates to vertical deflection circuits which produce the vertical scanning raster on the kinescope screen of television receivers, and more particularly to circuits for maintaining the scanning raster at a substantially constant height.

The brightness of a reproduced picture in a television receiver is determined by the amount of D.C. bias on the grid of the cathode ray tube. The brightness may be adjusted by varying the D.C. bias on the grid of the picture tube thereby varying the tube beam current, and may be made either in the control grid circuit or the cathode circuit. The change in beam current in the picture tube varies the high voltage on the tube due to the internal impedance of the high voltage supply. For example, if the beam current is decreased, the high voltage increases. With an increased high voltage, the electron beam becomes "stiffer," i.e. more difficult to deflect, requiring more energy from the deflection circuits. In the chosen example, if more current is not applied to the vertical deflecting coils from the vertical output stage, the height of the reproduced picture decreases.

Accordingly, it is an object of this invention to provide a novel height compensation circuit which maintains the scanning raster on the screen of a cathode ray tube at a substantially constant height as the tube beam current is varied.

In carrying out this invention, a compensating resistance is connected between the brightness control and the grid of the vertical output tube. The compensating resistance and the resistance provided by the biasing circuit for the vertical output tube are so proportioned that the bias on the grid of the vertical output tube is varied just the right amount to maintain the height of the picture on the cathode ray tube screen substantially constant as the setting of the brightness control is changed.

These and other advantages of this invention will be more clearly understood from the following description taken in connection with the accompanying drawing, and its scope will be apparent from the appended claims.

The drawing is a diagrammatic illustration of a circuit embodying the principles of this invention.

Referring now to the drawing, a video signal is applied at an input terminal 10 and to a cathode 18 of a cathode ray tube 20 via a coupling capacitor 12 and a filter network 15. Filter network 15 comprises an inductor 14 and a resistor 16 connected in parallel, and it functions in combination with the input tube capacity of the cathode ray tube 20 to prevent high frequency video signals from being severely attenuated due to the input capacity of the cathode ray tube 20. A brightness control 21, comprising potentiometer 22 having one terminal thereof connected to a source of B+ potential and another terminal thereof connected to ground, is coupled from the wiper arm 24 of potentiometer 22 to the cathode 18 of cathode ray tube 20 through filter 15. The brightness control 21 functions to vary the D.C. bias which is applied to the cathode 18 which in turn controls the beam current produced by the cathode ray tube 20. For example, as the wiper arm 24 is moved toward B+, a more positive potential is applied to the cathode 18 thereby decreasing the beam current. Conversely, as the wiper arm 24 is moved closer to ground potential, the beam current is increased due to the decrease in the amount of positive bias applied to the cathode 18.

It is obviously desirable to be able to vary the brightness of the reproduced picture on the screen of cathode ray tube 20, however, it is difficult to provide this function without interfering with the function performed by other circuits in the receiver. For example, if the beam current of the cathode ray tube 20 is decreased by applying more positive voltage from the brightness control 21, the high voltage on the anode of the cathode ray tube is increased. Reducing the beam current and increasing the high voltage of the cathode ray tube increases the stiffness of the electron beam of the tube, thus making the beam harder to deflect. Consequently, more energy is required from the deflecting circuits of the receiver to provide the full scanning raster on the screen of the cathode ray tube. In the cited example, the increased stiffness of the electron beam would normally cause the vertical height or size of the scanning raster to decrease requiring a larger peak-to-peak amplitude of saw-tooth current in the vertical deflection coils in order to maintain the height of the raster when the beam current is reduced.

The particular circuit shown by way of illustration in the drawing for supplying the saw-tooth current to the vertical deflection coils consists of a modified multivibrator having an input terminal 60 to which the negative vertical synchronizing pulses are applied. This circuit is shown and described in a copending application filed on September 16, 1957, bearing Serial No. 684,055 and assigned to the assignee of this application. The modified multivibrator has an electron discharge device 30 having a cathode 32, a control grid or electrode 34, a screen grid 36, a suppressor grid 38, and an anode 39, and a second electron discharge device 50 having a cathode 52, a control grid 54 and an anode 56. The negative synchronizing pulses are applied across a shunting capacitor 48 to the control grid or electrode 34 of tube 30. The suppressor grid 38 and the cathode 32 are connected to ground, and a B+ potential is supplied to the screen grid 36. The anode 39 of tube 30 is connected to a source of B+ potential through a primary winding 40 of a transformer 41. A secondary winding 42 of the transformer 41 is connected to output terminals 44 and 46. These terminals are connected to the vertical deflection coils of a magnetic yoke (not shown) which is mounted on the neck of the cathode ray picture tube. The anode 39 of tube 30 is coupled through a network 70 to a charging capacitor 74 which is connected to the grid 54 of the electron discharge device 50. The network 70 consists of a series connected capacitor 66 and a resistance 68, and a series connected resistance 71 and capacitor 72 which series circuits are connected in cascade. The capacitor 66 and the resistor 68 function to damp the fly-back pulses applied from the primary winding 40 when tube 30 stops conducting. The series circuit of the resistance 71 and the capacitor 72 filter out the horizontal pulses which are coupled in the plate circuit of tube 30 by the transformer 41 from the deflection yoke (not shown). The grid 54 of tube 50 is connected to ground through a series connected resistance consisting of a variable resistance 76 having a wiper arm 78 thereon, a variable resistance 80 having a wiper arm 82 thereon, and a resistor 84. The cathode 52 is connected to ground. The anode 56 of tube 50 is connected by a wiper arm 64 to a variable resistance 62 which has a B+ potential applied to one terminal thereof and a B+ boost potential applied to another terminal thereof. The anode 56 of tube 50 is coupled by a capacitor 58 to the grid 34 of tube 30. The biasing circuit for the grid 34 includes a resistor 88 and a resistor 85 which are connected in series with the wiper arm 82 of variable resistor 80. The junction of resistor 85 and resistor 88 is connected to ground through a capacitor 86. The resistor 85, resistor 88 and the capacitor 86 provide a bias on the tube 30, and also function as a filter for bias which is applied.

Although a complete description of the vertical output stage shown in the drawing has been given in the aforesaid copending application, a brief explanation of its operation will be given. The negative synchronizing pulses which are applied at terminal 60 to the grid 34 are amplified and inverted by the electron discharge device 30, and appear as positive-going pulses at the anode 39. These positive pulses are applied by the network 70 and the charging capacitor 74 to the grid 54 of electron discharge device 50. Electron discharge device 50 is normally maintained in a non-conductive state during the time between the synchronizing pulses by the bias provided by the discharge of capacitor 74 through variable resistor 76 and resistors 80 and 84. However, on the application of a positive-going pulse from the anode 39 of tube 30, the aforesaid bias is overcome causing the tube 50 to conduct. The conduction of tube 50 causes the anode 56 to be put at substantially ground potential due to the relatively low internal resistance of the tube 50 when conducting. Prior to conduction, the anode 56 was at a relatively high positive potential which put a substantial positive charge on one of the plates of capacitor 58. Consequently, when electron discharge device 50 conducts, the positive plate of capacitor 58 is placed at substantially ground potential, and the relatively large voltage that it had charged to prior to conduction is applied suddenly in a negative direction to capacitor 48 and to control grid 34 of tube 30. As a consequence thereof, tube 30 is cut-off quickly. When the electron discharge device 30 cuts-off, no current flows through the primary winding 40 of transformer 41 thereby resulting in a complete collapse in the magnetic field about winding 40 producing a large positive pulse, commonly called the fly-back pulse, on the anode 39 of the electron discharge device 30. The fly-back pulse is coupled through network 70 and capacitor 74 to the control grid 54 of the electron discharge device 50 which renders the control grid 54 positive. Electron discharge device 50 draws grid current, since the grid is positive with respect to the cathode, charging capacitor 74 toward the amplitude of the fly-back pulse. After the fly-back pulse reaches its maximum amplitude and starts decreasing, the voltage across capacitor 74 remains the same due to the fact that the grid 54 is now being biased more negatively as a result of the decreasing fly-back pulse thereby stopping conduction between the grid 54 and cathode 52. The capacitor 74 then discharges through variable resistor 76 and resistor 80 and resistors 84, 71, and 68. The discharge of capacitor 74 produces a negative cut-off bias on the grid 54 of electron discharge device 30. Capacitors 58 and 48 then discharge through the resistor 88, the resistor 85, a portion of the variable resistor 80, and the resistor 84 to ground. As the upper plate of capacitor 48 becomes more positive as it discharges, electron discharge device 30 begins conducting, producing an increasing flow of plate current at anode 39. This gradually increased plate current appearing at the anode 39 has a saw-tooth wave form which is applied to the vertical deflection coils (not shown) by transformer 41. The plate current of tube 30 continues to increase until another negative synchronizing pulse is applied at terminal 60. The aforesaid cycle is then repeated.

As previously mentioned, the height of the scanning raster depends upon the peak-to-peak amplitude of the saw-tooth current which is applied to the vertical deflecting coils. In the aforesaid circuit, electron discharge device 30 functions to provide the necessary saw-tooth voltage across the primary winding 40 to produce the aforesaid currents in the vertical deflecting coils. Obviously, due to the nonlinearity of the electron discharge device 30, the amplitude of this saw-tooth current may be varied by varying the bias which is applied to the grid 34 of electron discharge device 30. This may be accomplished by varying the position of the wiper arm 82 on variable resistor 80. It would be an inconvenience to continually make this adjustment, particularly since height adjustment is affected by other adjustments. As previously stated, the brightness adjustment varies the amount of energy required to deflect the beam, thus making it necessary to vary the bias on the tube 30 whenever the brightness control is varied if a constant height raster is desired. In accordance with the present invention, a resistor 26 is connected between the wiper arm 24 of brightness control 21 and the grid 34 of electron discharge device 30. The resistance of resistor 26 and the biasing resistance of tube 30 which consists of the resistances of resistor 88, resistor 85, a portion of variable resistor 80, and resistor 84 is so proportioned that as the brightness control is varied, a portion of the voltage is applied to the grid 34 of electron discharge device 30 to automatically compensate for the changes in brightness. For example, if the brightness is reduced by moving the wiper arm 24 in a more positive direction, the beam current is decreased causing an increase in high voltage which would normally cause the vertical height to decrease due to the increased stiffness of the electron beam. Increased stiffness of the electron beam normally requires greater deflection currents. However, by utilizing resistor 26 and properly proportioning it with respect to the resistance in the biasing circuit of grid 34, a higher positive voltage is provided on the grid 34. This causes the electron discharge device 30 to draw more current thereby increasing the peak-to-peak saw-tooth wave to overcome the increased stiffness of the beam caused by the change in brightness.

By way of example only, circuit parameters which have been found suitable in the circuit shown in the drawing for providing substantially constant height on a scanning raster even though the brightness is varied are as follows:

| | | |
|---|---|---|
| Variable resistor 22 | ohms | 200K |
| Resistor 26 | megohms | 36 |
| Resistor 88 | ohms | 330K |
| Resistor 85 | | .027 |
| Variable resistor 80 | ohms | 400K |
| Resistor 84 | do | 100K |
| Variable resistor 76 | megohms | 1.5 |
| Resistor 62 | do | 5 |
| Capacitor 74 | micromicrofarads | 3.3K |
| Capacitor 58 | microfarads | .015 |
| Capacitor 48 | do | .047 |
| Capacitor 86 | do | .027 |
| Tube 30 | | 12R5 |
| Tube 50 | | ½5DH8 |

As will be obvious to those skilled in the art, the specific type of vertical output circuit shown in the drawing is not required, and any type of vertical output stage which produces the necessary saw-tooth voltage is all that is required. The only critical requirement resides in the proper proportioning of the resistance in the biasing circuit of the vertical output tube with that resistance which is connected between a source of brightness control voltage and the biasing circuit. As will appear obvious from the above circuit parameters, only a small portion of the voltage change in the brightness adjustment need be applied to the vertical output tube to provide proper height compensation.

Since other modifications and changes varied to fit particular operating requirements and environments will be apparent to those skilled in the art, the invention is not considered limited to the examples chosen for purposes of illustration and covers all changes and modifications which do not constitute departures from the true spirit and scope of this invention.

What we claim as new and desire to secure by Letters Patent of the United States is:

1. A circuit for maintaining the height of the scanning raster on a cathode ray tube screen substantially constant as the beam current of the cathode ray tube is varied by a brightness control voltage comprising, in combination, a cathode ray tube having a screen on which the scanning raster appears and a control electrode, brightness control means coupled to said control electrode for varying the beam current of said cathode ray tube, a vertical ouput stage for providing the output required for the vertical scanning of the cathode ray tube beam, said vertical output stage having a control electrode, means for applying a bias on said control electrode, means for coupling said brightness control means to said control electrode whereby the bias on said control grid is varied as beam current of said cathode ray tube is varied by said brightness control means to maintain the vertical height of said scanning raster substantially constant.

2. A circuit for maintaining the scanning raster on the screen of a cathode ray tube at a substantially constant height as the beam current of the cathode ray tube is varied by a brightness control voltage comprising, in combination, means for applying a video signal to a control electrode of the cathode ray tube, brightness control means coupled to the control electrode of said cathode ray tube for varying the beam current of said cathode ray tube, a vertical output tube for providing the drive voltage necessary to produce the vertical scanning raster on the cathode ray tube, said vertical output tube having a control electrode, biasing means connected to said control electrode for controlling the output of said vertical output tube, a resistance connected between said brightness control means and said control electrode, said resistance being so proportioned with respect to said biasing means that the bias on said control electrode varies proportionately in accordance with variations of beam current provided by said brightness control means to maintain the height of the scanning raster on the screen of the cathode ray tube at a substantially constant level.

3. A circuit for maintaining the scanning raster on the screen of a cathode ray tube at a substantially constant height as the beam current of the cathode ray tube is varied comprising, in combination, a cathode ray tube having a control electrode, a brightness control means coupled to the control electrode of said cathode ray tube, a vertical output tube having a control electrode, biasing means coupled to the control electrode of said vertical output tube, and a resistance coupled between said brightness control means and the control electrode of said vertical output tube.

References Cited in the file of this patent

UNITED STATES PATENTS

| | | |
|---|---|---|
| 2,303,924 | Faudell | Dec. 1, 1942 |
| 2,547,289 | Smart | Apr. 3, 1951 |
| 2,688,712 | Proctor | Sept. 7, 1954 |

FOREIGN PATENTS

| | | |
|---|---|---|
| 713,011 | Great Britain | Aug. 4, 1954 |